(12) United States Patent
Pennington

(10) Patent No.: US 8,140,506 B2
(45) Date of Patent: Mar. 20, 2012

(54) FILE SHARING BASED ON SOCIAL NETWORK

(75) Inventor: Havoc Pennington, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 109 days.

(21) Appl. No.: 11/565,292

(22) Filed: Nov. 30, 2006

(65) Prior Publication Data
US 2008/0133445 A1    Jun. 5, 2008

(51) Int. Cl.
  *G06F 7/00* (2006.01)
  *G06F 17/30* (2006.01)
(52) U.S. Cl. ........ 707/706; 707/783; 705/319; 709/203; 709/204; 709/229; 709/245
(58) Field of Classification Search .................. None
See application file for complete search history.

(56) References Cited

U.S. PATENT DOCUMENTS

| | | | |
|---|---|---|---|
| 6,144,963 A * | 11/2000 | Tsuda | 707/10 |
| 6,535,228 B1 * | 3/2003 | Bandaru et al. | 715/752 |
| 6,754,900 B1 * | 6/2004 | Kelley et al. | 719/319 |
| 7,130,880 B1 * | 10/2006 | Burton et al. | 709/203 |
| 7,277,896 B2 * | 10/2007 | Matsubara et al. | 707/102 |
| 7,716,140 B1 * | 5/2010 | Nielsen et al. | 705/319 |
| 7,730,130 B2 * | 6/2010 | Issa | 709/204 |
| 2001/0047400 A1 * | 11/2001 | Coates et al. | 709/219 |
| 2002/0188735 A1 * | 12/2002 | Needham et al. | 709/229 |
| 2003/0154238 A1 * | 8/2003 | Murphy et al. | 709/201 |
| 2004/0220899 A1 * | 11/2004 | Barney et al. | 707/1 |
| 2005/0198385 A1 * | 9/2005 | Aust et al. | 709/245 |
| 2006/0117378 A1 * | 6/2006 | Tam et al. | 726/3 |
| 2007/0156702 A1 * | 7/2007 | Jain | 707/10 |
| 2007/0157104 A1 * | 7/2007 | Blain et al. | 715/771 |
| 2007/0255785 A1 * | 11/2007 | Hayashi et al. | 709/204 |

\* cited by examiner

*Primary Examiner* — Khanh Pham
*Assistant Examiner* — Azam Cheema
(74) *Attorney, Agent, or Firm* — Lowenstein Sandler PC

(57) ABSTRACT

Embodiments of the present invention provide for sharing files within a social network. Members of the social network are provided a set of virtual folders that indicates groups and other members that are authorized for file sharing. The folders are automatically maintained for the social network. In addition, various folders may be designated for different levels of access. For example, public folders may be accessible to anyone, while private folders could be restricted to one or members of the social network. The file sharing folders would be provided as part of the social network online service, and thus, are maintained without user configuration.

21 Claims, 3 Drawing Sheets

FILE SHARING BASED ON SOCIAL NETWORK

FIELD OF THE INVENTION

The present invention relates to online services and communications tools and, more particularly, to social networks.

BACKGROUND OF THE INVENTION

In its short history, Internet usage has been mainly driven by portals and search engines, such as Yahoo! and Google. Recently, the rapid growth of social networking sites, such as MySpace and Facebook, has revealed a new trend of Internet usage. Social networking generally relates to services and tools that help users maintain and expand their circles of friends usually by exploiting existing relationships. Social networking sites have shown potential to become the places on the Internet where many people spend most of their time, thus making these sites the main entry point for online activity. Often times, these social networking sites can become the focal point of sharing information, such as links, multimedia, music, and the like.

In general, social networking sites and other online services of the Internet offer a mix of features and tools, such as message boards, games, journals or web logs ("blogs"). One of the main features utilized by social network sites is file transfers and downloads.

File transfers in a network computer system is a well-known concept. For example, in the early days of the Internet, file transfers were accomplished by connecting to a destination computer and executing a file transfer command (e.g. FTP). This type of data transfer can be referred to as a client-server model.

The client-server model of data transfer has disadvantages and faults. For example, if one server or several servers store copies, i.e., mirrors, of a file(s), these server(s) can be rapidly overwhelmed in response to a spike of popularity of the file(s). Accordingly, the user experience in obtaining these file(s) may be less than satisfactory.

Peer-to-peer (P2P) systems offer advantages over the traditional client-server model. A P2P computer network is a network that relies primarily on the computing power and bandwidth of the participants in the network rather than concentrating it in a relatively low number of servers. P2P networks are typically used for connecting nodes via largely ad hoc connections. Such networks are useful for many purposes.

Although P2P networks can offer greater bandwidth and availability of files, there are still drawbacks and disadvantages. For example, since a selected file is distributed among the peers in a given P2P network, a file download may not ever be completed if the peer that has the missing segment does not participate in the P2P network or is not online at the same time as the user. Moreover, a user may not be ensured that a segment may be infected with malicious software (malware such as spyware, viruses, etc.).

Accordingly, there is need for a P2P network system for social network services that provides a measure of security as well as availability.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide for sharing files within a social network. Members of the social network are provided a set of virtual folders that indicates groups and other members that are authorized for file sharing. The folders are automatically maintained for the social network. In addition, various folders may be designated for different levels of access. For example, public folders may be accessible to anyone, while private folders could be restricted to one or members of the social network. The file sharing folders would be provided as part of the social network online service, and thus, are maintained without user configuration.

Reference will now be made in detail to the exemplary embodiments of the invention, which are illustrated in the accompanying drawings. Wherever possible, the same reference numbers will be used throughout the drawings to refer to the same or like parts.

Figure 1:
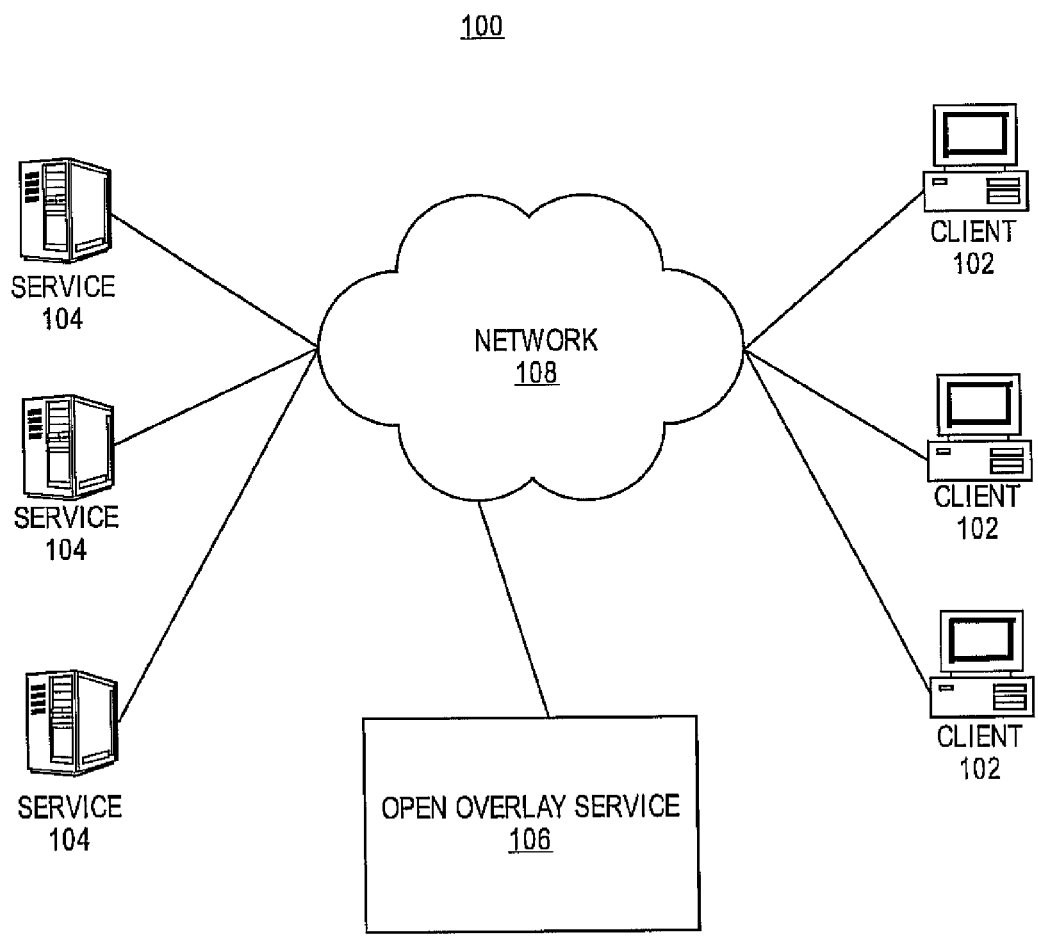
FIG. 1 illustrates an exemplary system that is in accordance with embodiments of the present invention.

FIG. 1 illustrates a system 100 that is consistent with the principles of the present invention. As shown, the system 100 may comprise one or more clients 102, a plurality of services 104, an open overlay service 106, and a network 108. In general, system 100 may be implemented on a widely available data network, such as the Internet. For example, system 100 may be implemented as a combination web site and client application that enables users and friends to participate in a live social context. These components will now be generally described.

Client 102 provides a user interface for system 100. Client 102 may be implemented using a variety of devices and software. For example client 102 may be implemented on a personal computer, workstation, or terminal. In addition, client 102 may run under an operating system, such as the LINUX operating system, the Microsoft™ Windows operating system, and the like. Client 102 may also operate through an Internet browser application, such as Firefox by Mozilla, Internet Explorer by Microsoft Corporation, or Netscape Navigator by Netscape Communications Corporation.

One skilled in the art will also recognize that client 102 may be implemented with various peripheral devices, such as a display, one or more speakers, and other suitable devices. Client 102 may also be implemented with various peripherals for accepting input from a user, such as a keyboard, a mouse, and the like. Although FIG. 1 shows a number of clients 102, system 100 may include any number of clients.

Services 104 are the applications and services that users of system 100 already use. Services 104 may be implemented on one or more servers that are well known to those skilled in the art. Rather than recreating functionality, open overlay service 106 merely interfaces services 104 and allows users to seamlessly continue using the services, such as social networking services, instant messaging, etc., that they currently use. Examples of services 104 include iTunes, Yahoo Music Engine, MySpace, Friendster, AOL Instant Messenger, Yahoo! Messenger, etc. Any sort of online service may be incorporated into the context provided by open overlay service 106.

Open overlay service 106 serves as a social network service and stores, manages, and provides access control to the various services and social networks of clients 102. In general, open overlay service 106 is essentially a web site and application service that stores and forwards information shared by users, as well as user profiles and social network information. Open overlay service 106 may be hosted as a public instance, similar in fashion to a service, such as Wikipedia. In addition, open overlay service 106 may provide various application programming interfaces that have an open specification so that anyone can create an interface.

For example, open overlay service 106 may process requests to retrieve an object, document, image file, web page, and the like. Open overlay service 106 may be implemented using a variety of devices and software. For example, open overlay service 106 may be implemented as a web site running on one or more servers that support various application programs and stored procedures.

The components of system 100 may be coupled together via network 108. Network 108 may comprise one or more networks, such as a local area network, the Internet, or other type of wide area network. In addition, network 108 may support a wide variety of known protocols, such as the transport control protocol and Internet protocol ("TCP/IP") and hypertext transport protocol ("HTTP").

Figure 2:
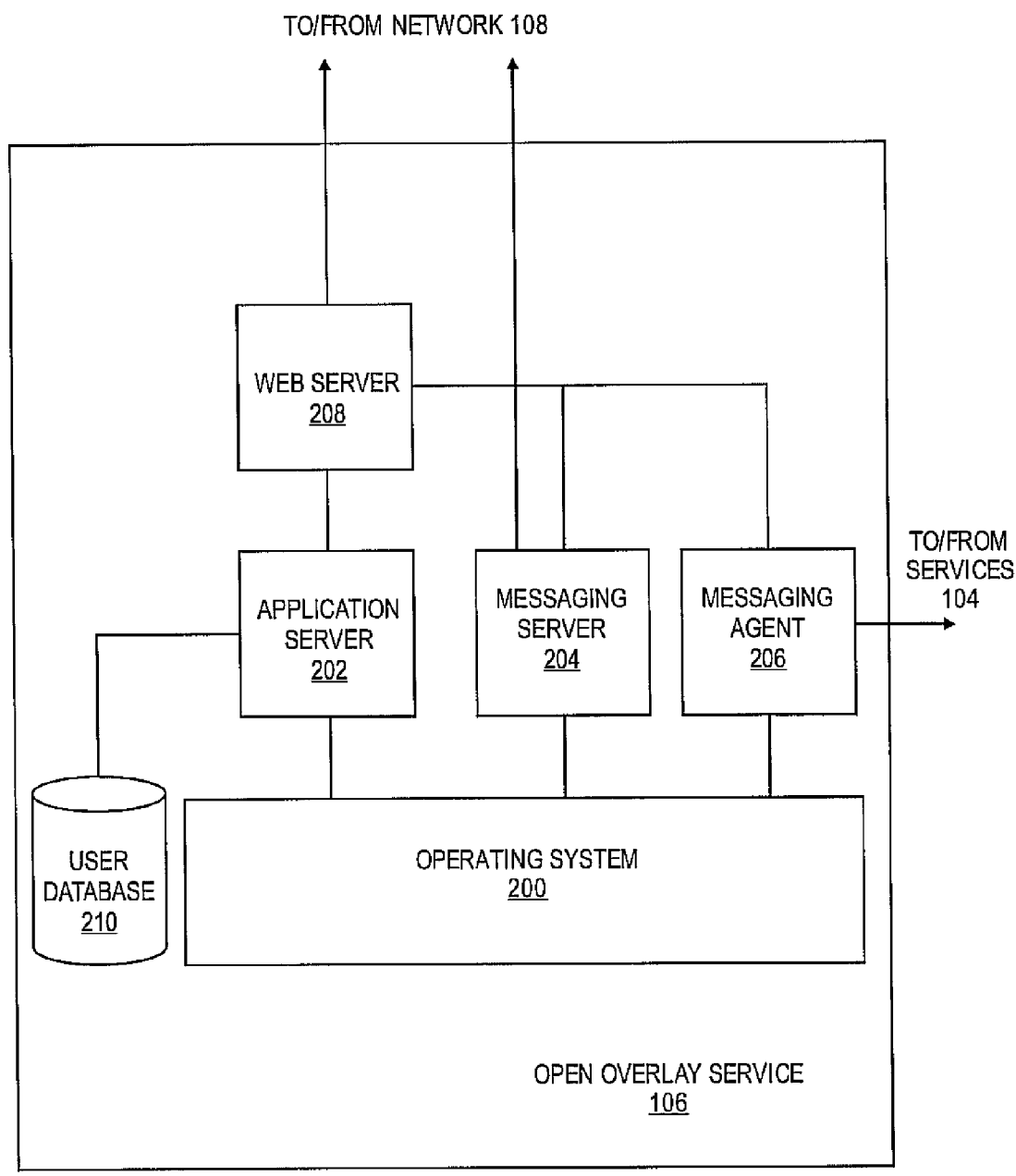
FIG. 2 illustrates an exemplary architecture for an open overlay service that is consistent with the principles of the present invention.

FIG. 2 illustrates an exemplary architecture for open overlay service 106 that is consistent with the principles of the present invention. As shown, open overlay service 106 may comprise an operating system 200, an application server 202, a messaging server 204, a messaging agent 206, a web server 208, and a user database 210. These components may be implemented as software, firmware, or some combination of both, which may be loaded into memory of the machine embodying open overlay service 106. The software components may be written in a variety of programming languages, such as C, C++, Java, etc. These components will now be generally described.

Operating system (OS) 200 is an integrated collection of routines that service the sequencing and processing of programs and applications running in open overlay service 106. OS 200 may provide many services, such as resource allocation, scheduling, input/output control, and data management. OS 200 may be predominantly software, but may also comprise partial or complete hardware implementations and firmware. Well known examples of operating systems that are consistent with the principles of the present invention include the Linux operating system, the UNIX operating system. In addition, OS 200 may operate in conjunction with other software, such as an application server, such as JBoss, to implement various features of open overlay service 106.

Application server 202 provides the logic for analyzing and managing the operations of open overlay service 106. As previously noted, application server 202 may be written in a variety of programming languages, such as C, C++, Java, etc.

For example, one responsibility of application server 202 may be managing the various identities of the users of open overlay service 106. As noted previously, a single person may have multiple identities that they use for various online services and social networks, For example, a person named, John Smith, may use jsmith@domain.com as an identity one service, but use smithj@domain2.com as his identity on another service.

In one embodiment, in order to track the various users of open overlay service 106, application server 202 may assign each user a unique identifier, such as a numeric identifier. Application server 202 may then utilize this unique identifier with the identity resources (i.e., email address, account names, screen names, etc.) used by services 104 to identify a person. In some embodiments, application server 202 generates a graph of each social network within open overlay service 106 in terms of person's names and the identity resources from the point of view of a particular user based on what is trusted by that user.

For example, given information about a person's name, their unique identifier assigned by application server 202, and associations to identity resources trusted by other users, application server 202 can generate a list of person names and identity resources (i.e., email address, account names, etc.) that should be visible to a particular user. Hence, the particular user will only be allowed to see identity resources they happen to (or only) know about that user and identity resources that have been verified by application server 202. For example, a user A may have a unique identifier of 2345, and email address #1 and email address #2 as identity resources. A user B may only know about email address #1 for user A. Meanwhile, a user C may similarly only know about email address #2 for user A. Thus, for user B, application server 202 will only allow user B to view and use email address #1 as an identity resource for user A. Likewise, application server 202 will only allow user C to view and use email address #2 as an identity resource for user A. However, if user A subsequently explicitly indicates to application server 202 that both users B and C can be trusted, then users B and C will then be also allowed to view both email addresses #1 and 2, as well. The primary uses of this information by open overlay service 106 may be for sharing a link with person by addressing that person either by an email address or by a short nickname, or for viewing a list of persons in open overlay service 106 that they think they know.

Application server 202 may also determine what information of a user should be public or private. In some embodiments, application server 202 may default to making information public, but provide an option, such as a checkbox, that allows the user to designate information as private. Application server 202 may also employ per page settings, such as all private or all public. Other privacy policies may be implemented by application server 202.

Application server 202 may further provide various search features. For example, application server 202 may allow users to search for other users based on various criteria, such as age, gender, school, etc. Application server 202 may also allow searches for various resources, such as email addresses, topics, links, etc.

Messaging server 204 manages communications between open overlay service 106 and clients 102 via network 108. For example, messaging server 204 may be configured to periodically poll clients 102 on a regular basis and have them request information from services 104. Messaging server 204 may be implemented based on well-known hardware and software and utilize well-known protocols, such as TCP/IP, hypertext transport protocol, etc.

Messaging server 204 may be configured to handle a wide variety of data and may handle data that is in any format. For example, information from clients 102 may be in the form of an extensible markup language (XML) file or a network location, such as a uniform resource locator (URL) on the Internet. Alternatively, messaging server 204 may be configured to obtain information from services 104 directly in a peer-to-peer fashion.

Messaging agent 206 serves as an interface between open overlay service 106 and online services 104 and may operate to monitor the activity of clients 102 at these services. In particular, messaging agent 206 may be a relatively small and focused computer application (or "bot") that runs continuously, in the background simultaneously for each of clients 102, as other programs are being run, and responds automatically to activity on services 104 that may be of interest to clients 102, such as new messages, postings, and the like.

Messaging agent 206 may be created by open overlay service 106 (i.e., by application server 202) for the benefit of the users at clients 102. Alternatively, for example, messaging server 204 may send information to clients 102 upon request, perform automated searches, or monitor messages or events at services 104.

In one embodiment, messaging server 204 and/or messaging agent 206 may work in conjunction to perform client-side data scraping on services 104. Client-side data scraping may be desirable in some instances where services 104 refuse or block a direct interface with open overlay service 106. For example, MySpace and AOL's instant messaging service may be implemented as one of services 104, but is known to block proxy requests for a client.

Client-side data scraping may be initiated by messaging server 204 or using information provided by messaging server. Messaging server 204 may poll client overlay client 302 to trigger a request to one of services 104. Accordingly, overlay client 302 may cause one of service applications 306 to interface with service 104 and request data from that service, such as web page refresh. Since the request originated from client 102, service 104 will provide a response. Overlay client 302 may detect this response and forward it to messaging server 204. Messaging server 204 may then pass this response. Of course, the polling may be configured at overlay client 302 based on information provided to messaging server 204.

Messaging server 204 evaluates the response and determines if a notification event is needed. If notification is needed, messaging server 204 send a message to overlay client 302. The notification may then be displayed to the user using, for example, browser 304 or service application 306.

One application of client-side data scraping may be used to detect when messages or postings have been entered on one of services 104. For example, on MySpace, users often repeatedly refresh their pages in anticipation of receiving a post or message from a friend. With client-side data scraping, open overlay service 106 may automatically perform this function, and more conveniently, indicate when the user has received activity on their MySpace page. This notification may appear in the form of a pop-up bubble or may be displayed as a link on the user's page in open overlay service 106. Of course, other applications of client-side data scraping are consistent with the principles of the present invention.

Web server 208 provides a communications interface between open overlay service 106, clients 102, and services 104. For example, web server 208 may be configured to provide information that indicates the status of client 102. Such communications may be based on well known protocols and programming languages, such as HTTP, TCP/IP and Java. Interfaces provided by web server 208 may be implemented using well known Internet technologies, such as web pages, which are well known to those skilled in the art.

User database 210 maintains information identifying users and clients 102. User database 210 may be implemented using well known database technology, such as relational databases, or object oriented databases.

For example, user database 210 may include information indicating one or more operating systems and applications installed on clients 102 as well as services subscribed to by users. User database 210 may also comprise information related to authenticating a user determining the respective rights of a user relative to other users. For example, a user may select various groups or channels of content in which they are interested in receiving information. User database 210 may further include information that indicates the permissions and delivery of the information to clients 102. Other information that may be included in user database 210 may comprise information, such as system and individual permissions of clients 102 on services 104, activation keys, registration information, and payment information (such as credit card information).

Furthermore, user database 210 may include other information related to the manner in which open overlay service 106 communicates with clients 102. For example, this information may relate to periodicity of notifications, email addresses, format of the formation, and the like. User database 210 may include data structures to log the activities and transactions of its users. Activities, such as recent links, history of operations, etc., that may be logged in user database 210 are well known to those skilled in the art.

Figure 3:
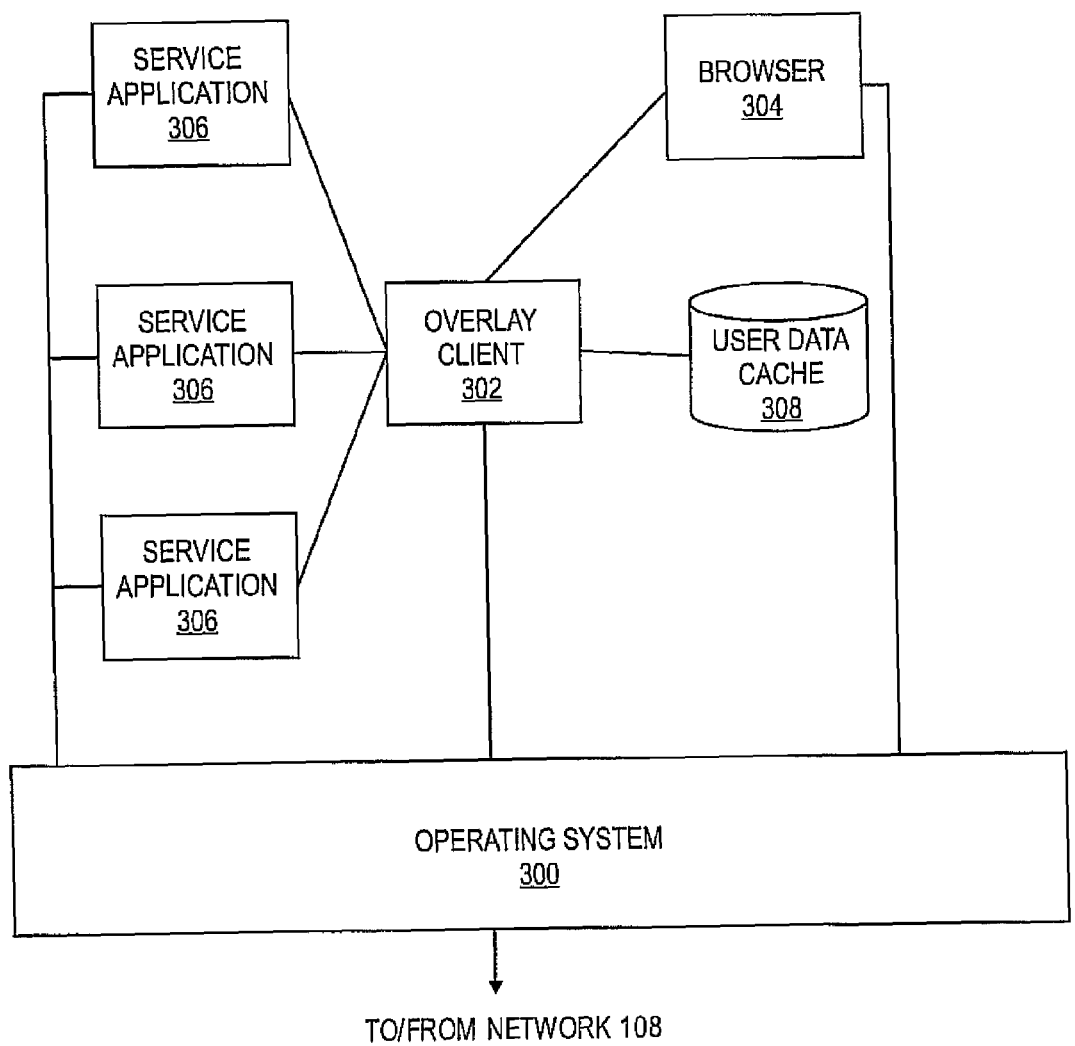
FIG. 3 illustrates an exemplary architecture for clients that are consistent with the principles of the present invention.

FIG. 3 illustrates an exemplary architecture for clients 102 that are consistent with the principles of the present invention. As noted, clients 102 may be implemented on a conventional device, such as personal computer, laptop, and the like. Such devices are well known to those skilled in the art and may typically include hardware, such as a processor, a memory, a display, a storage device, a keyboard, a mouse, and a network interface for network 108. Such hardware supports the operation of various components software. As shown, the software running on client 102 may comprise an operating system 300, an overlay client 302, a browser 304, one or more service applications 306, and a user data cache 308. Each of these software components will now be generally described.

Operating system (OS) 300 is an integrated collection of routines that service the sequencing and processing of programs and applications running in open overlay service 106. OS 300 may provide many services, such as resource allocation, scheduling, input/output control, and data management. OS 300 may be predominantly software, but may also comprise partial or complete hardware implementations and firmware. Well known examples of operating systems that are consistent with the principles of the present invention include Mac OS by Apple Computer, the Windows family of operating systems by Microsoft Corporation, and the Linux operating system.

Overlay client 302 maintains an inventory of the software and service applications 306 installed on client 102 and archives one or more states of activity on client 102. In some embodiments, overlay client 302 may be configured to periodically connect to open overlay service 106 and perform various operations requested by open overlay service 106.

Browser 304 is an application that runs on client 102 and provides an interface to access information on network 108, such as information on services 104. Browser 304 may be implemented as well known programs, such as Mozilla Firefox, Microsoft Internet Explorer, Netscape Navigator, and the like.

Service applications 306 run on client 102 to support the services provided by services 104. For example, service applications 306 may be applications, such as a browser, an instant messaging client, a music player (such as iTunes), and the like that are provided from services 104. Other examples for applications 306 are well known to those skilled in the art.

User data cache 308 provides a cache that indicates the activity of a user at client 102. For example, user data cache 308 may include information that indicates documents, such as HTML pages, images, URL links, web site access times, and the like.

In order to illustrate some of the features of open overlay service 106 that provide a live social context, a protocol for establishing secure P2P storage with users of the social network service will now be described. In general, users in a social network may indicate permissions and storage space to open overlay service 106 that they pledge to the P2P storage infrastructure. Open overlay service 106 may then establish a series of peer to peer contracts based on the permissions and storage space. Open overlay service 106 may also represent this infrastructure as a "virtual" drive or folders.

In some embodiments, clients 102 use data connections, such as the jive connection, to know about all peers globally in open overlay service 106. Clients 102 may then indicate storage space that is pledged as part of the P2P storage infrastructure.

In order to protect and secure the P2P storage infrastructure, clients 102 may encrypt files with a private key and use symmetric encryption. The original uploader may use public key cryptography brokered by open overlay service 106 to encrypt the private key for each intended recipient. Accordingly, the file uploaded into the P2P storage infrastructure is thus the same for all authorized users of open overlay service 106. Hence, a per-recipient distinct copy is unnecessary, which would be case if open overlay service 106 used a standard public key encryption scheme.

In some embodiments, the symmetric key is a content hash of the uploaded file's contents. This allows the encrypted version of the file to be the same for any identical copy of the file. This feature also allows multiple encrypted copies of the file, rather than requiring a single point of controlled uploads of a file from the P2P storage infrastructure. Open overlay service 106 is configured to make the P2P storage infrastructure transparent by using the user identity and authentication concepts described above.

If needed, open overlay service 106 may allow anonymous peers to participate in the P2P storage infrastructure. For example, network bandwidth across network 108 may be limited for some of clients 108. Accordingly, open overlay service 106 may utilize services of other clients 102 that have available resources to assist in sharing files. However, in most instances, open overlay service 106 may be configured to avoid using anonymous peers.

In order to ensure redundancy and availability, open overlay service 106 may be configured to construct the P2P storage infrastructure using a hierarchical tree structure. For example, each peer could connect to one peer further up a level in the tree, and one peer on the same tier with a different parent node. In some embodiments, open overlay service 106 may utilize XMPP as the control protocol for setting up this tree structure.

Once the P2P storage infrastructure is in place, open overlay service 106 may then offer a virtual drive or folder for files that can be shared within a social network. In some embodiments, this virtual drive or folder appears as an icon on clients 102 desktop display and and inside it there are folders for social networks, (e.g., friends and family) that files are shared with. In some embodiments, open overlay service 106 automatically maintains these drives or folders for the whole social network. In particular, open overlay service 106 may offer this feature with little or no user configuration. Instead, it would offered as a standard service of the user's account with open overlay service 106 and their membership to various social networks.

For example, if a user places a file for sharing with a user, then only that user would see that file. The user may also receive a notification indicating a new shared file has been uploaded. Open overlay service 106 may also maintain public files for files that may be shared with anyone. Hence, anyone on network 108 could load the file. This feature could be useful, for example, for photo hosting and so forth.

Furthermore, open overlay service 106 may provide private files. If a file is uploaded to a private file, then only authorized users could see that file. This feature may be useful, for example, to move files between two clients 102, or for making a backup copy.

In some embodiments, the file upload/storage/browsing is implemented in a web-based way. In particular, application server 202 may provide a servlet implementing read-only WebDAV and that allows a user to browse a file hierarchy via the DAV support in GNOME's Nautilus file manager. Of course, embodiments of the present invention may be implemented on Microsoft Windows machines using, for example, Windows Network Places.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of sharing files, said method comprising:
   receiving, by a computing device executing an open overlay service supporting a plurality of social network services, pledges of storage space from a plurality of users, wherein each pledge contributes a pledged amount of storage space for use in a peer-to-peer (P2P) storage infrastructure;
   constructing, by the computing device, the P2P storage infrastructure based on the pledges of storage space;
   identifying a folder of the P2P storage infrastructure to be shared with a first user of the open overlay service, wherein the folder corresponds to pledged storage space on a machine of a second user of the open overlay service;
   determining a social network service of the plurality of social network services to which the second user belongs;
   determining, based on an account of the first user with the open overlay service, whether the first user is allowed to view an identifier of the second user, wherein the identifier is used in conjunction with an account of the second user with the social network service;
   in response to determining that the first user is allowed to view the identifier of the second user, performing the following:
      providing to the first user a virtual folder corresponding to the folder to be shared with the first user, that is accessible to the first user; and
      populating the virtual folder with identifications of files that are placed in the folder by the second user to be shared with the first user.

2. The method of claim 1, wherein the second user of the open overlay service is a member of a social network of the first user.

3. The method of claim 1, wherein the virtual folder is accessible to all users of the open overlay service.

4. The method of claim 1, further comprising sending a notification to the first user when the virtual folder is populated with the identifications of the shared files.

5. The method of claim 1, wherein the identifications of the shared files comprise links to the shared files.

6. The method of claim 1, wherein the shared files are transferred via a peer-to-peer network upon the first user selecting the identifications.

7. The method of claim 1, wherein the shared files are transferred through a central server of the open overlay service upon the first user selecting the identifications.

8. The method of claim 7, wherein the central server of the open overlay service encrypts the shared files with a private key that is shared with the first user and the second user.

9. The method of claim 1, further comprising:
establishing a secure P2P connection between the first user and the second user; and
transferring a file that was placed in the folder via the P2P connection upon the first user selecting an identification for the file.

10. The method of claim 1, wherein the first user does not belong to the social network service to which the second user belongs.

11. A system for sharing files among users of an open overlay service supporting a plurality of social network services, said system comprising:
a processor adapted to execute the open overlay service, wherein the open overlay service is configured to receive pledges of storage space from a plurality of users, wherein each pledge contributes a pledged amount of storage space for use in a peer-to-peer (P2P) storage infrastructure, and to construct the P2P storage infrastructure based on the pledges of storage space; and
a memory, coupled to the processor, adapted to maintain a folder to be shared with a first user of the open overlay service, wherein the folder corresponds to pledged storage space on a machine of a second user of the open overlay service; and maintain a virtual folder corresponding to the folder to be shared with the first user, that is accessible to the first user;
wherein the open overlay service is further configured to determine a social network service of the plurality of social network services to which the second user belongs, determine, based on an account of the first user with the open overlay service, whether the first user is allowed to view an identifier of the second user, wherein the identifier is used in conjunction with an account of the second user with the social network service, and populate the virtual folder with identifications of files that are placed in the folder by the second user of the open overlay service, if the first user is allowed to view the identifier of the second user.

12. The system of claim 11, wherein the second user of the open overlay service is a member of a social network of the first user.

13. The system of claim 11, wherein the virtual folder is accessible to all users of the open overlay service.

14. The system of claim 11, wherein the open overlay service is configured to send notifications to the first user when the virtual folder is populated with the identifications of the shared files.

15. The system of claim 11, wherein, the open overlay service is configured to transfer the shared files through a central server of the open overlay service upon the first user selecting the identifications.

16. The system of claim 11, wherein the identifications of the shared files comprise links to the shared files.

17. A computer readable storage medium comprising instructions for an open overlay service, wherein the instructions cause causing a computer to perform a method comprising:
receiving, by the computer, pledges of storage space from a plurality of users, wherein each pledge contributes a pledged amount of storage space for use in a peer-to-peer (P2P) storage infrastructure;
constructing, by the computer, the P2P storage infrastructure based on the pledges of storage space;
identifying a folder of the P2P storage infrastructure to be shared with a first user of the open overlay service, wherein the folder corresponds to pledged storage space on a machine of a second user of the open overlay service, and wherein the open overlay service supports a plurality of social network services;
determining a social network service of the plurality of social network services to which the second user belongs;
determining whether the first user is allowed to view an identifier of the second user, wherein the identifier is used by the social network service;
providing to the first user a virtual folder corresponding to the folder to be shared with the first user, that is accessible to the first user, if the first user is allowed to view the identifier of the second user; and
populating the virtual folder with identifications of files that are placed in the folder by the second user to be shared with the first user.

18. The computer readable storage medium of claim 17, wherein the second user of the open overlay service is a social network of the first user.

19. The computer readable storage medium of claim 17, wherein the virtual folder is accessible to all users of the open overlay service.

20. The computer readable storage medium of claim 17, further comprising instructions for causing a computer to send a notification to the first user when the virtual folder is populated with the identifications of the shared files.

21. The computer readable storage medium of claim 17, wherein the identifications of the shared files comprise links to the shared files.

* * * * *